US012217309B1

(12) United States Patent
Ritsema et al.

(10) Patent No.: US 12,217,309 B1
(45) Date of Patent: Feb. 4, 2025

(54) SYSTEMS AND METHODS FOR BUSINESS EVENT DRIVEN ANALYTICS

(71) Applicant: State Farm Mutual Automobile Insurance Company, Bloomington, IL (US)

(72) Inventors: Rene Liane Converse Ritsema, Downs, IL (US); Philip A. French, Bloomington, IL (US); Shrenik Vora, Bloomington, IL (US); Molly Bonney, Bloomington, IL (US); Mark G. Quenette, Bloomington, IL (US)

(*) Notice: Subject to any disclaimer, the term of this patent is extended or adjusted under 35 U.S.C. 154(b) by 1677 days.

(21) Appl. No.: 16/046,380

(22) Filed: Jul. 26, 2018

Related U.S. Application Data

(60) Provisional application No. 62/642,818, filed on Mar. 14, 2018, provisional application No. 62/613,562, filed on Jan. 4, 2018, provisional application No. 62/540,433, filed on Aug. 2, 2017.

(51) Int. Cl.
*G06Q 40/08* (2012.01)
*G06F 11/30* (2006.01)

(52) U.S. Cl.
CPC ......... *G06Q 40/08* (2013.01); *G06F 11/3075* (2013.01); *G06F 11/3086* (2013.01); *G06F 2201/86* (2013.01)

(58) Field of Classification Search
CPC ............................ G06Q 40/08; G06F 11/3086
See application file for complete search history.

(56) References Cited

U.S. PATENT DOCUMENTS

| 8,463,624 | B2 * | 6/2013 | Hashim | G06Q 10/0633 |
| | | | | 705/4 |
| 8,984,536 | B1 * | 3/2015 | Hushon, Jr. | G06F 21/6281 |
| | | | | 719/318 |
| 10,649,824 | B1 * | 5/2020 | Tan | G06F 9/542 |
| 2002/0010679 | A1 * | 1/2002 | Felsher | G06F 21/6245 |
| | | | | 705/51 |

(Continued)

FOREIGN PATENT DOCUMENTS

EP            4113407 A1 *  1/2023   ........... G06F 16/906

OTHER PUBLICATIONS

Wegener, John A., and Rodney L. Davis. "Extension of a Common Data Format for Real-Time Applications." International Foundation for Telemetering, 2004. (https://repository.arizona.edu/handle/10150/604961) (Year: 2004).*

*Primary Examiner* — Asha Puttaiah
(74) *Attorney, Agent, or Firm* — Lee & Hayes, P.C.

(57) ABSTRACT

A computer-implemented method obtains information related to a business process. The computer-implemented method may include (1) capturing business event information for a business event that occurs during the business process; (2) generating a unique identifier configured to identify the business event; (3) translating the business event information into a final event record including the unique identifier, the final event record being configured according to a common data structure; and (4) storing the final event record in a database for analysis. As such, the computer-implemented method permits business information to be captured from disparate business processes and to be stored in a common format to facilitate efficient and productive analysis.

18 Claims, 7 Drawing Sheets

(56) References Cited

U.S. PATENT DOCUMENTS

| | | | | |
|---|---|---|---|---|
| 2003/0046639 A1* | 3/2003 | Fai | ............... | G06Q 10/10 |
| 2003/0093302 A1* | 5/2003 | Quido | ............... | G06Q 40/08 |
| | | | | 705/4 |
| 2009/0265385 A1* | 10/2009 | Beland | ............... | G06F 16/258 |
| 2010/0228581 A1* | 9/2010 | DeFrancesco | ......... | G06Q 10/10 |
| | | | | 707/E17.017 |
| 2013/0204645 A1* | 8/2013 | Lehman | ............... | G06Q 40/08 |
| | | | | 705/4 |

\* cited by examiner

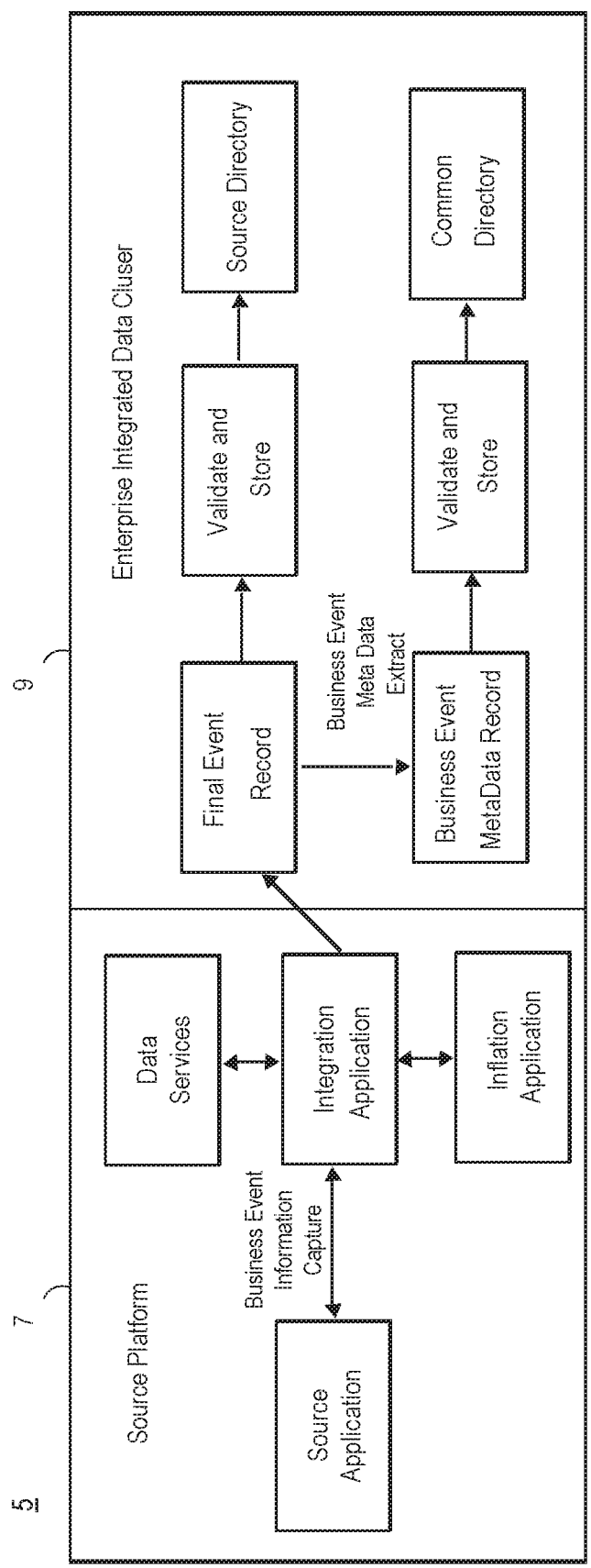
FIG. 1A(ii)

SYSTEMS AND METHODS FOR BUSINESS EVENT DRIVEN ANALYTICS

CROSS-REFERENCE TO RELATED APPLICATIONS

The current patent application is a non-provisional patent application which claims priority benefit with regard to all common subject matter to U.S. Provisional Application Ser. No. 62/540,433, titled "SYSTEMS AND METHODS FOR BUSINESS EVENT DRIVEN ANALYTICS", filed Aug. 2, 2017; U.S. Provisional Application Ser. No. 62/613,562, titled "SYSTEMS AND METHODS FOR BUSINESS EVENT DRIVEN ANALYTICS", filed Jan. 4, 2018; and U.S. Provisional Application Ser. No. 62/642,818, titled "SYSTEMS AND METHODS FOR BUSINESS EVENT DRIVEN ANALYTICS", filed Mar. 14, 2018. The listed earlier-filed provisional applications are hereby incorporated by reference in their entireties into the current patent application.

FIELD OF THE INVENTION

The present disclosure generally relates to computer-implemented methods, systems, and electronic devices for capturing business event information and for translating the captured business event information into a standardized, common data structure.

BACKGROUND

In the past, various methods have been used to capture and analyze information related to business processes. Such information may be quite valuable, as the information can be used to improve business processes, to improve customer experiences, to determine new business opportunities, to determine potential business threats (e.g., fraudulent transactions), and the like. Examples of previously-used methods includes the use of system logs, which collect and record various pieces of business information associated with a particular business process. However, such previously-used methods have multiple drawbacks.

For instance, previously-used system logs may capture business information on a periodic basis, such as daily, weekly, or monthly. As such, analysis of the business information may be quite slow and inefficient. Furthermore, business information captured in standard system logs may be required to be formatted, and re-formatted, over long periods of time before the business information is formatted in a manner sufficient for further analysis and use.

In addition, previously-used methods for capturing business information may be generally configured to capture specific types of business information, and in disparate formats or data structures, based upon the particular type of business processes from which the business information is being captured. As such, business information captured from disparate business process may be stored in independent, distinct formats, which inhibits efficient analysis and use of the captured business information.

BRIEF SUMMARY

Embodiments of the present technology relate to computer-implemented methods, systems, and electronic devices for capturing business event information, and for translating the captured business event information into a standardized, common data structure.

In a first aspect, a computer-implemented method for obtaining information related to a business process may be provided. The computer-implemented method may comprise, via one or more processors, servers, and/or transceivers: (1) capturing business event information for a business event that occurs during the business process; (2) generating a unique identifier configured to identify the business event; (3) translating the business event information into a final event record, with the final event record being formatted according to a common data structure, and with the final event record including the unique identifier; and/or (4) storing the final event record in a database. The method may include additional, fewer, or alternative actions, including those discussed elsewhere herein, and may be implemented via one or more local or remote processors, and/or via computer-executable instructions stored on non-transitory computer-readable media or medium.

In another aspect, a computer-implemented method for obtaining information related to a business process may be provided. The method may include, via one or more processors, servers, and/or transceivers: (1) capturing business event information for a first business event that occurs during the business process, and for a second business event that occurs during the business process; (2) generating a first unique identifier configured to identify the first business event, and a second unique identifier configured to identify the second business event; and/or (3) translating the business event information for the first business event into a first final event record and the business event information for the second business event into a second final event record. Both the first final event record and the second final event record may be formatted according to a common data structure. The first final event record may include the first unique identifier, and the second final event record may include the second unique identifier. The method may include additional, fewer, or alternative actions, including those discussed elsewhere herein, and may be implemented via one or more local or remote processors, and/or via computer-executable instructions stored on non-transitory computer-readable media or medium.

In another aspect, a computer-implemented method for obtaining information related to one or more business processes may be provided. The method may include, via one or more processors, servers, and/or transceivers: (1) capturing business event information for a first business event and for a second business event, with each business event occurring during the one or more business processes; (2) generating a first unique identifier configured to identify the first business event, and a second unique identifier configured to identify the second business event; and/or (3) translating the business event information for the first business event into a first final event record, and the business event information for the second business event into a second final event record. Both first final event record and the second final event record may be configured according to a common data structure. The first final event record may include the first unique identifier, and the second final event record may include the second unique identifier. The method may include additional, fewer, or alternative actions, including those discussed elsewhere herein, and may be implemented via one or more local or remote processors, and/or via computer-executable instructions stored on non-transitory computer-readable media or medium.

In another aspect, a computing device for obtaining information related to a business process may be provided. The computing device may include one or more processing elements, transceivers, and/or memory elements. The memory elements may include a program configured to instruct the processing elements to: (1) capture business event information for a business event that occurs during the business process; (2) generate a unique identifier configured to identify the business event; (3) translate the business event information into a final event record, with the final event record being formatted according to a common data structure, and with the final event record including the unique identifier; and/or (4) store the final event record in a database. The computing device may include additional, fewer, or alternate components and/or functionality, including that discussed elsewhere herein.

In yet another aspect, non-transitory computer-readable medium with a program stored thereon for obtaining information related to a business process may be provided. The program may instruct a processing element to perform the following: (1) capture business event information for a business event that occurs during the business process; (2) generate a unique identifier configured to identify the business event; (3) translate the business event information into a final event record, with the final event record being formatted according to a common data structure, and with the final event record including the unique identifier; and/or (4) store the final event record in a database. The program stored on the computer-readable medium may instruct the processing element to perform additional, fewer, or alternative actions, including those discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of computer-implemented methods, systems comprising computer-readable media, and electronic devices disclosed therein. It should be understood that each Figure depicts an embodiment of a particular aspect of the disclosed methods, media, and devices, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

FIG. 1A(ii) depicts another embodiment of an exemplary Business Event Management Framework 5, which may be similar to or the same as the Business Event Management Framework 100 of FIG. 1A(i), and which is configured for capturing business events and related data according to another aspect of the present embodiments;

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments relate to, inter alia, business event management and event-driven architecture. The event-driven architecture may provide a number of business benefits. For instance, the benefits may include (i) increased transparency of customer engagement with an enterprise across all types of communication channels (e.g., telephone, online, text, face-to-face or in person, etc.); (ii) improved ability to effectively message customers based upon customer activities across the enterprise; and/or (iii) improved customer analytics due to finer grained data available based upon the established business events. Also, improved production reporting capabilities may enable process improvement, and provide more timely information and new metrics based upon the business events monitored/tracked.

The event-driven architecture may include an architecture pattern promoting the production, detection, consumption of, and/or reaction to occurrences of interest, such as business events or other events, in near real-time. Methods of event capture may include capturing (a) raw events—an event that is captured directly from the source of knowledge; (b) derived events—an event that is inferred from data, or changes in data; and/or (c) synthetic events—an event that is generated as an intermediate outcome of "event correlation rules" (i.e., complex event processing).

The present embodiments may include several architectural events. The architectural events may include (i) loose coupling (leveraging pub/sub to expose events out to interested parties); (ii) complimenting service-oriented architecture (SOA) principles (separation of services); (iii) scalability; (iv) distributable across all platforms; (v) real time streaming; and/or (vi) conformance across all sources.

The event-driven architecture may facilitate business events being leveraged in many ways within and across business capabilities. For example, the event-driven architecture may include utilizing (a) triggers to drive process orchestration; (b) messaging and notification (i.e., publication/subscription (pub/sub)); (c) complex event processing to identify and respond to behavioral patterns in near real-time; (d) monitoring, measurement, and reporting associated with business events; (e) business process improvement; (f) discovery and predictive analytics; and/or (g) simulation of business processes.

Figure 1A:
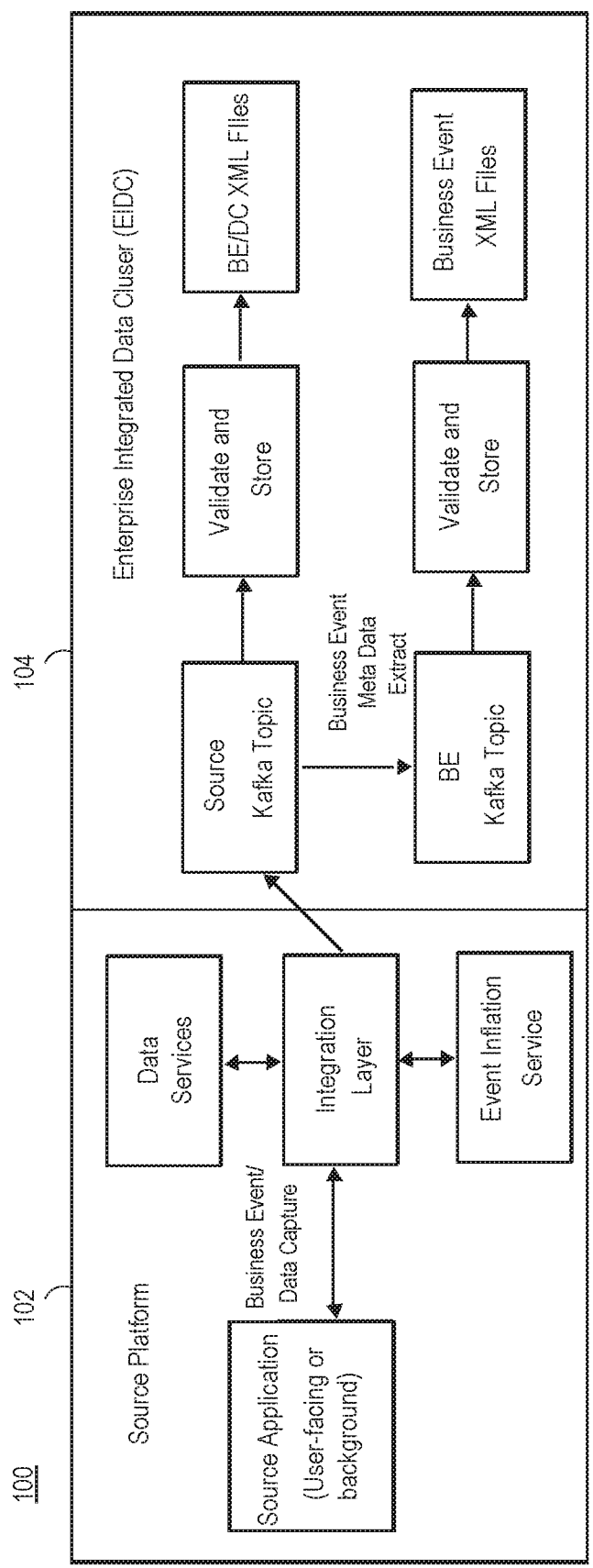
FIG. 1A(i) depicts an exemplary Business Event Management Framework 100 for capturing business events and related data according to one aspect of the present embodiments.

FIG. 1A(i) depicts an exemplary Business Event Management Framework 100 for capturing business events and related data. The Event Management Framework 100 may capture events and associated data together, and in a big data environment for analysis, including human or machine-based analysis, such as processors employing artificial intelligence and/or machine learning algorithms.

The events captured may be individual business events, and the related data may detail what happened; where, how, and when it happened; who was involved with the event if applicable; what data and/or what type of data was captured; and/or other data, including that discussed elsewhere herein. In one insurance-related embodiment, the events may relate to transactions related to insurance policies; customer agreements; customer initiated events or communications; customer requests, such as get an insurance quote (e.g., a price calculated event) or file an insurance claim; changes in customer information, such as change of address or add a driver or vehicle to policy; adding or changing policies or coverages; and/or other events, including those discussed elsewhere herein. The events may also relate to "life events," such as a birth, marriage, divorce, graduating high school or college, death, moving to or purchasing a new house or apartment, purchasing a new vehicle, etc.

In one embodiment, events for a new insurance customer may include receiving a request for quote (for instance, at an insurance provider server or call center); receiving customer information (such as name, address, etc.); providing a quote; receiving acceptance; receiving payment or notification of purchase; notification of a bound or binding agreement; sending confirmations to the customer via a communication channel; and/or other quote-related events. Events for an existing insurance customer may include receiving a claim; receiving supporting documents, such as digital images received over the internet; retrieving the insurance policy; verifying coverages, conditions, and/or limits; handling the claim; paying the claim in accordance with the policy; and/or other claim-related milestones.

The data may include user-entered data or representative entered data, or retrieved stored data. The data may detail the type of insurance, such as homeowners, auto, health, life, renters, personal articles, pet, commercial, or other types of insurance. The data may include policy information, such as policy number, date, coverages, deductibles, terms, conditions, insured(s), driver(s), beneficiaries, etc.

In one aspect, a number of the events may each be a common event across various product lines. For instance, home, auto, life, and other types of insurance may have common events related to new customers, customer communications or notification, renewals, cancellations, quotes, claims, payment, non-payment, change in policy, change in customer information, and/or other events.

The present embodiments may allow for correlating events across time and processes to perform analytics. The analytics may be performed by a data analyst or by a processor programmed with artificial intelligence or a machine learning algorithm (such as deep learning, combined learning, and/or reinforced learning algorithms). For instance, the events may include customer interactions with an insurance provider. Analysis of the events and data may indicate or identify patterns of customer behavior, such as a likelihood of switching providers based upon a propensity for comparison shopping.

Also, the event-driven architecture may allow for review and analysis of a large amount of data and/or patterns embedded within the data. For instance, online insurance or financial (e.g., vehicle, home, or personal loan) applications may require a potential new customer to fill out or answer several questions. In one embodiment, answers of multiple potential customers may be collected, monitored, and/or analyzed. It may be determined from the event and data analysis of where a potential customer enters and leaves a process, such as the process of filling out an online application. It may be determined from the event and data which specific questions customer don't like to answer or find confusing or annoying (e.g., question #6), and/or why potential customers leave the process of completing an online application, or switching providers.

The present embodiments may include (i) events generated via a business process; (ii) a conformed event structure; (iii) common events regardless of source application (for instance, various insurance product lines may have common events, such as "request a quote," "file a claim," "change customer information," "renew," "cancel," etc.); (iv) event and data snapshots captured and passed together to an analytic platform; (v) all events "landed" in a common event directory for effective customer/associate/etc. analysis; (vi) capturing associative keys (clients, associate, claim, etc.) that identify each event to enable correlation across multiple sources; (vii) allowing for consumption of events and data at multiple points across the architecture (e.g., synchronous, asynchronous, and/or batch/bulk consumption techniques); (viii) allowing for events and data to be captured via multiple customer communication channels (telephone, mail, email, text, online, chat, etc.); and/or (ix) capturing events once, but using the events multiple times based upon business requirements.

With reference to FIG. 1A(i), the Event Management Framework 100 may include a Source Platform 102 and an Enterprise Integrated Data Cluster (EIDC) 104. The Source Platform 102 may include one or more Source Applications in communication with an Integration Layer. The Integration Layer is also in communication with Data Services and an Event Inflation Service, and with the EIDC 104.

The business events may be generated or detected by one or more Source Applications of the Source Platform 102. For instance, as a Source Application executes events, or executes code associated with various events, the Source Application or the Integration Layer may capture the business event and associated data during each event, or after each event is completed. For instance, the event and data may be captured as a customer moves or progresses through a business process (such as the process of requesting a new insurance quote and obtaining coverage, or filing and processing an insurance claim).

The Source Platform 102 may also include Data Services. The Data Services may allow for flexible consumption of the events and data captured. The Data Services may also use events and data currently in the Kafka queue, for instance.

An event and data "snapshot" may include passing raw data from the Source Application and/or Integration Layer of the Source Platform 102 to a Hadoop or other framework within the EIDC 104. In one embodiment, with the EIDC 104, the data may be extracted and copied to a common event directory for ease of analytics, such as copied to the Business Event XML Files of the EIDC 104. The Event Management Framework 100 may include additional, less, or alternate functionality, including that discussed elsewhere herein.

The business events and related data may be captured once, and used several ways. For instance, the events and data may be used for (i) operational purposes; or (ii) analytics. The operational purposes may relate to issuing new policies, renewing existing policies, or cancelling policies at customer request. For instance, if events indicate a new customer approved a policy and paid the premium, the new policy may become effective. The events and data may be consumed on a synchronous or asynchronous basis, and be analyzed to provide (a) downstream reporting, and/or (b) financial reporting. For example, total exposure or risk in a given jurisdiction may be tracked to ensure that the exposure or risk remains within acceptable limits.

Exemplary Business Event Management Framework

In more detail, the present embodiments may comprise computing devices, software applications, systems, and methods, for capturing data and information associated with business events (referred to herein as "business event information") and for translating the business event information into final event records that conform to a standardized, common data structure. The computing devices and/or system of the present embodiments, through hardware operation, execution of the software application and/or computer program, implementation of the method, or combinations thereof, may be utilized as provided in the following description.

FIG. 1A(ii) depicts another exemplary embodiment of a Business Event Management Framework, referred to by reference numeral 5, for capturing business event information associated with business events that occur during the performance or execution of a business process. The Business Event Management Framework 5 may also be configured to translate or transform the captured business event information into final event records each conforming to a standardized, common data structure, such that the final event records can be stored and efficiently analyzed. Broadly, the Business Event Management Framework 5 may comprise (1) a Source Platform 7 for capturing businesses event information for business events that occur during a business process and for translating the captured business event information into a common data structure, and (2) an Enterprise Integrated Data Cluster (EIDC) 9 for storing and analyzing the captured business event information.

In more detail, the Business Event Management Framework 5 may be configured to capture and/or generate business event information for a plurality of businesses events that occur during one or more business processes and to translate the captured business event information into final event records that are formatted in conformance with a standardized, common data structure. The final event records may, in some embodiments, be considered data "snapshots" of the business process at the moment the business event occurred. Upon creation of the final event records, the Business Event Management Framework 5 may provide the final event records to a big-data storage environment, such as the EIDC 9, for analysis. Such analysis can include human or machine-based analysis, with such machine-based analysis perhaps incorporating processors employing artificial intelligence and/or machine learning algorithms.

Figure 1B:
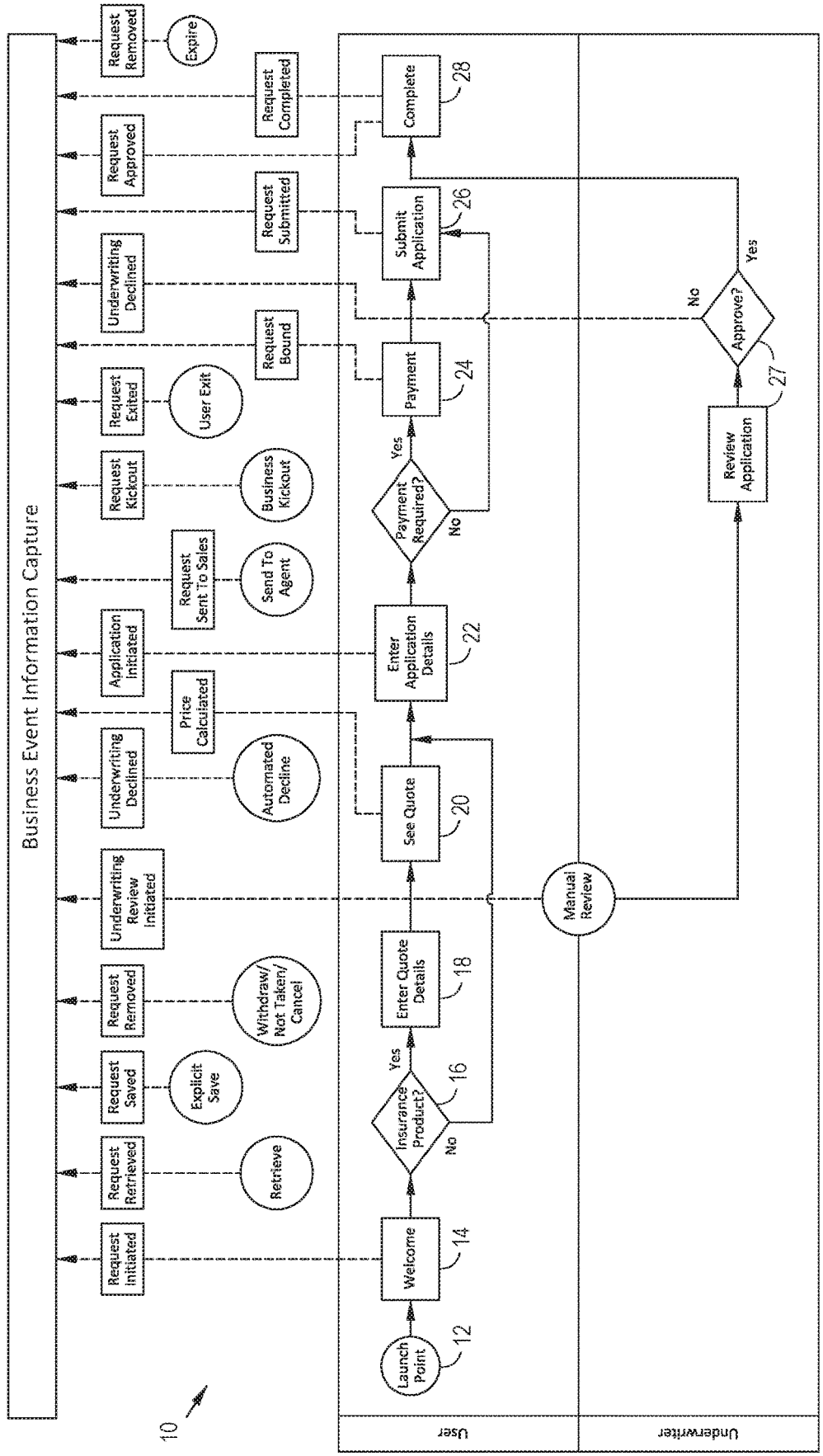
FIG. 1B illustrates a flowchart of exemplary business event information being captured for business events that occur during a business process according to one aspect of the present embodiments.

The business events that occur during a business process and for which business event information may be captured by the Business Event Management Framework 5 may include, as discussed above, individual business events, and the related data may detail what happened; where, how, and when it happened; who was involved with the business event, if applicable; what data and/or what type of data was captured; and/or other information or data, including that discussed elsewhere herein. An exemplary business process 10 is illustrated in FIG. 1B and generally depicts a business process workflow with a plurality of business event capture points. The capture points are locations within the business process at which business events occur and, thus, for which business event information can be captured. As will be described in more detail below, the business process 10 of FIG. 1B illustrates numerous business events that occur during execution of the business process 10, with the present embodiments being configured to capture business information for each of such business events.

Turning back to FIG. 1A(ii), the Source Platform 7 of the Business Event Management Framework 5 may include one or more Source Applications in communication with an Integration Application. The Integration Application may, itself, be in communication with a Data Services component and an Inflation Application, which are each also included within the Source Platform 7. The business processes from which business event information can be captured by the Source Platform 7 may generally be made available by the one or more Source Applications. For example, a particular Source Application may provide for the business process 10 of FIG. 1B to be made available for a user (e.g., a customer) to perform. As the customer performs the business process 10, the Source Application and/or the Integration Application may detect and/or generate business events that occur during, or as a result of, the customer's performance of the business process 10.

For each of the occurring business events (such as the process of requesting a new insurance quote and obtaining coverage, or filing and processing an insurance claim), the Source Application and/or the Integration Application may capture the business event information associated with such business events. In embodiments in which the Source Application captures the business event information, the Source Application may, thereafter, provide the business event information to the Integration Application for further use, as will be described in more detail below.

The Source Platform 7 may also include the Data Services component, which may be used, or called upon, by the Integration Application to enhance or enrich the business event information that is captured for each business event and that is provided to the Integration Application. The Data Services component may allow for flexible consumption of the captured business event information, such as may be necessary to format the business event information into the final event record. The Data Services component may also have access to and use business event information and/or final event records currently in queue to be provide to the EIDC 9, such as may be required for the Data Services component's enhancement or enrichment of the business event information.

Upon obtaining the business event information (as perhaps enhanced or enriched by the Data Services component), the Integration Application may provide the business event information to the Inflation Application, which is configured to validate the business event information and to translate the business information into the final event record that is formatted according to a common data structure. As part of the final event record, the Integration Application may generate and/or assign a unique identifier to the final event record, with such unique identifier being used to identify the final event record and/or the business event for which the business event information was captured. Upon formatting the business event information into the final event record, the Inflation Application may be configured to provide the final event record back to the Integration Application, such that the Integration Application can pass the final event record from the Source Platform 7 to the EDIC 9 for storage and analysis.

As will be described in more detail below, the EIDC 9 may comprise one or more databases, or other data storage and analysis systems. In some embodiments, the databases provided by the EIDC 9 may be configured as Hadoop® systems. Upon receiving the final event record from the Integration Application, the final event records may be validated and stored in a Source Directory database of the EIDC 9. The Source Directory database may be a data storage element that is only accessible by the Source Platform 7 and/or the Source Application or by the owner of the Source Platform 7 and/or Source Application. As such, in some embodiments, only the owner of the Source Platform 7 and/or of the Source Application may have access to the final event records stored in the Source Directory database. In additional embodiments, a portion of the business event information included within the final event record may be extracted and stored in a common directory, shown in FIG. 1A(ii) as the Common Directory database.

In such embodiments, the Common Directory database may be accessible by other entities or applications, including entities other than the owner of the Source Platform 7 and/or the Source Application. As such, the information and data stored in the Common Directory database can be configured for direct access and analysis various parties, thereby permitting consumption of information from multiple points across an architecture (e.g., including using synchronous, asynchronous, and/or batch/bulk consumption techniques).

The present embodiments, as discussed above and as described in more detail below, may allow for the analysis and correlation of various business events captured from disparate business processes and from different time periods. Specifically, embodiments may translate business event information, which may be related to various business events that are captured from disparate business processes, into final event records that share a common data structure. The final event records may be provided to a data storage and analysis platform, such as the EIDC 9, for storage and further analysis. The analytics may be performed by a data analyst or by a processor programmed with artificial intelligence or a machine learning algorithm (such as deep learning, combined learning, and/or reinforced learning algorithms). For instance, the final event records for business events may include information related to customer interactions with an insurance provider via a business process. Analysis of the final event record (and the business event information included therein) may indicate or identify patterns of customer behavior, such as a likelihood of switching providers based upon a propensity for comparison shopping.

Furthermore, many business processes (even those be made available by different Source Applications) may have similar, or the same, business events that occur during performance of such business processes. For example, many insurance-related business processes will include the following business events: "request a quote," "file a claim," "change customer information," "renew," "cancel," etc. Final event records created for such similarly-occurring business events may share many of the same data elements, such that these final event records can be efficiently compared with each other for analysis once in the EIDC 9.

Exemplary Business Event and Data Capture

In one aspect, the present embodiments may relate to computing devices, software applications, systems, and methods for capturing business event information associated with business events that occur during a business process, and for translating the captured business event information into a final event record conformed to a standardized, common data structure. The computing devices and/or system of the present embodiments, through hardware operation, execution of the software application and/or computer program, implementation of the method, or combinations thereof, may be utilized as provided in the following description.

In more detail, a computing device of a user may be used to provide the user with access to a business process. The user may be a customer or client of the owner of the Source Application that makes the business process available to the user. Exemplary business processes may include, for instance, insurance-related business processes, such as insurance policy acquisition processes, insurance policy renewal processes, insurance policy closure processes, insurance claim handling or processing, auto or home loan generation or quotation, or the like.

For example, the business process 10 shown in FIG. 1B illustrates a business process by which a user can obtain an insurance-related product, such as an insurance policy. In some embodiments, the user may be a new customer. In such embodiments, the business events that may occur during the business process, and for which business event information can be captured, may include, for instance: receiving a request for quote (for instance, via an online program, at an insurance provider server, or through a call center); receiving customer information (such as name, address, etc.); providing a quote; receiving acceptance; receiving payment or notification of purchase; notification of a bound or binding agreement; sending confirmations to the customer via a communication channel; and/or other quote-related business events.

Examples of other insurance-related business processes, which may be used by existing customers, may include processes related to customer agreements; customer initiated events or communications; customer requests, such as get an insurance quote (e.g., a price calculated event) or file an insurance claim; changes in customer information, such as change of address or add a driver or vehicle to policy; adding or changing policies or coverages; and/or other insurance-related issues, including those discussed elsewhere herein. Such business processes may also relate to "life events," such as a birth, marriage, divorce, graduating high school or college, death, moving to or purchasing a new house or apartment, purchasing a new vehicle, etc. Business events that may occur during such business processes for existing customers, may include, for instance: receiving a claim; receiving supporting documents, such as digital images received over the internet; retrieving the insurance policy; verifying coverages, conditions, and/or limits; handling the claim; paying the claim in accordance with the policy; and/or other claim-related milestones.

It should be understood, however, that present embodiments provide for business event information to be captured for business processes that are not insurance-related. For instance, embodiments may provide for the capture of business event information for business events that occur during generally any type of business process through which a user provides information to a business entity and/or obtains or alters a business product provided by a business entity.

As will be described in more detail below, the business event information captured for each of the business events that occur during a business process may include various types of data, such as customer-entered data, associate-entered data, or retrieved and/or stored data. For instance, for insurance-related processes, the business event information may include data that details the type of insurance being sought by the customer, such as homeowners, auto, health, life, renters, personal articles, pet, commercial, or other types of insurance. The business event information may also include policy information, such as policy number, date, coverages, deductibles, terms, conditions, insured(s), driver(s), beneficiaries, etc.

In one aspect of the present embodiments, certain business events may exist and be the same across various different business processes or across various products offered via business processes. For instance, home, auto, life, and other types of insurance products may each share common business events related to new customers, customer communications or notification, renewals, cancellations, quotes, claims, payment, non-payment, change in policy, change in customer information, and/or the like. Embodiments may make use of the business event information, and the resulting final event records, for such similar business events as a way to enhance the ability to efficiently analyze and compare business processes.

Regardless of the type of business process (e.g., insurance-related or non-insurance related), business processes may generally be made available to a user by way of the user's computing device. Specifically, the Source Application of the Source Platform 7 is configured to make the business process available to the user's computing device. The Source Application may be provided via one or more business servers communicating over a communications network with the user's computing device, as will be described later in more detail below. For example, in some embodiments, the business process may be made available to the user's computing device through an Internet connection with a business server running the Source Application. In other embodiments, the user's computing device may provide access to the business process directly through the Source Application, which may be in the form of a software application or a mobile app, which is executable on the user's computing device. In still other embodiments, the business process may be made available via e-mail, SMS text, online chat, voice telephone, regular mail, or the like. Regardless, in certain embodiments, the user, via the user's computing device, may perform steps of the business process so as to complete (either partially or entirely) the business process. During such performance, business events may occur, and embodiments of the present invention are configured to capture business event information related to such business events.

In more detail, the present embodiments may capture raw data in the form of business event information related to one or more business events that occur during the performance of a business process. For each business event, the captured business event information may include (1) business event identification information ("B/E identification information"), which is information/data that is representative of the particular business event that occurred, and (2) business event process information ("B/E process information"), which is information/data relevant to the business process at the time the business event occurred. Certain embodiments may be configured to translate the raw data comprising the captured business event information into a final event record that is formatted according to a common data structure. As described in more detail below, final event records may be representative of the captured business event and any related information that may corresponds with the business event or with the business process. Because embodiments provide for the final event records to be formatted according to a common data structure, such final event records will be formatted consistently for all business events and/or across all business processes. As such, the common data structure enhances the ability to analyze and compare final event records of business events that occur across various business processes and from disparate Source Applications.

In more detail, each final event record may comprise a data file, such as an extensible markup language (XML) file, that is formatted according to a common data structure. The common data structure may comprise (1) an event metadata section configured to include event metadata representative of captured B/E identification information for a business event, and (2) one or more payload sections that include captured data representative of the captured B/E process information for the business event. Some embodiments may provide for the common data structure to be uniform for all final event records, i.e., to include a consistent event metadata section and consistent payload sections, such that all final event records will be formatted according to same common data structure for all business events regardless of the business process from which the business event information was captured.

As an example, FIG. 1B generally depicts a workflow of a business process 10 through which a user can progress to obtain an insurance product. An exemplary insurance product may include a vehicle insurance policy. FIG. 1B also illustrates capture points for various business events that occur during the performance of the business process 10, with the present embodiments capturing business information for each of such business events. The business process 10 may be performed by a user interacting with the user's computing device. For example, one or more business servers may execute a Source Application (e.g., a software/computer program) that makes the business process 10 available to the user's computing device over a communications network, such as over the Internet. As such, the user may access the business process 10 via a web browser of the user's computing device and may, therefrom, perform the steps of the business process 10. As was described previously, however, it should be understood that business events may be captured for business processes that are performed with other technologies, such as via e-mail, SMS text, online chat, voice telephone, regular mail, or the like.

Referring to FIG. 1B, the exemplary business process 10 may begin at the "Launch Point" 12, at which time the Source Application begins execution of the business process 10. From the Launch Point 12, the user may be presented with a "Welcome" screen 14 and is, then, asked at step 16 if the user is interested in obtaining an insurance product, such as auto, life, renters, homeowners, personal articles, or health insurance. If the user indicates, "yes," then the business process 10 continues through the remaining steps required for the user to obtain the insurance product. Such remaining steps may include, for instance, receiving user information necessary to calculate a price quote 18, providing a price quote 20, receiving application information 22, receiving a payment 24, and submitting the final application 26 for the insurance product. Additional steps or elements of the business process 10 may occur that are outside of the user's interactions with the business process 10. For example, after the user submits the final application, an underwriting process 27 may occur by which the user's application is approved or declined. The business process 10 may end at the "Complete" step 28, at which time the user will have been approved or declined for obtaining the insurance product.

Throughout the execution of the business processes, multiple business events may occur. As noted previously, the term "business event" may mean any significant action, behavior, or experience that occurs as the business process is being performed. For example, with respect to the business process 10 illustrated in FIG. 1B, the following business events may occur: the start of the business process 10 (e.g., Launch Point 12), the end of the business process 10 (e.g., Complete 28), occurrences of information being provided to or received from the user during the business process 10 (e.g., presenting the user with an insurance quote at 20), significant actions or behaviors exhibited by the user interacting with the business process 10 (e.g., the user indicating whether or not the user is interested in obtaining a quote at 18), changes of state that occur during the business process 10 (e.g., user's application is approved or declined at underwriting 27).

However, it should be understood that the above listed business events are exemplary, and business events may include generally any important event, action, and/or occurrence that take place throughout the performance of the business process 10. Furthermore, it is contemplated that business events may evolve and change over time, as the importance of certain events, actions, and/or occurrences change or become better understood. Beneficially, because embodiments provide for captured business event information to be translated into final event records that are formatted according to a common data structure, business processes may be revised as necessary without affecting the ability to capture and analyze business events that occur during such business processes.

The present embodiments may be configured to capture business event information for each of the business events that occur during a business process. To provide illustrative examples, the insurance product acquisition business process 10 illustrated in FIG. 1B may include the following two business events: (1) presenting the user with a price quote 20 for the insurance product, and (2) the user entering application details 22 for the insurance product. For each of these business events, embodiments are configured to capture business event information (i.e., B/E identification information and B/E process information), and to translate such business event information into final event records that are each formatted according to a common data structure.

As noted above, the common data structure of the final event records may comprise: (1) an event metadata section populated with event metadata representative of the B/E identification information, and/or (2) one or more payload sections that include captured data representative of the B/E process information. The business event information, as translated into the common data structure of the final event record, may be stored in one or more databases for future use and analysis. Because all final event records generated for captured business events are formatted according to the common data structure, certain embodiments may provide for all business events, regardless of the business processes from which the business events are captured, to be efficiently analyzed and compared with each other.

Although the above exemplary business events were illustrated as being captured from the business process 10 shown in FIG. 1, it should be understood that business event information may be obtained for any business event captured from any type of business process. Once captured, the business event information may be translated into final event records having a common data structure, such that the final event records can be efficiently analyzed, compared, and used. Specifically, some embodiments may provide for business events across generally any type of business process to be efficiently analyzed and compared with each other so as to improve business processes. For example, embodiments may allow for: (1) discovering problems within individual business processes, (2) improving efficiencies and user interactions with individual business processes, (3) predicting customer behaviors, (4) sharing information between disparate business processes, and/or (5) comparing business events across disparate business processes to improve functionalities and efficiencies of business process.

Exemplary Computer System

Figure 2:
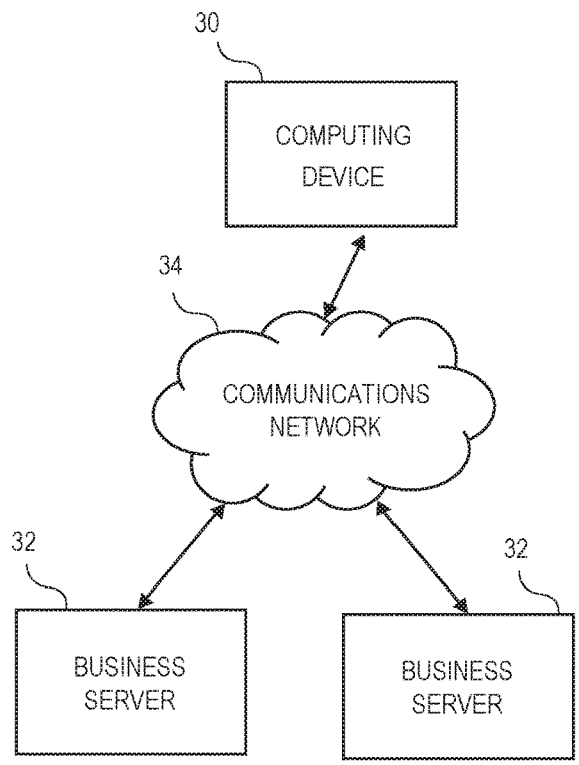
FIG. 2 illustrates various components of an exemplary computer system for obtaining information from business events shown in schematic form.

FIG. 2 depicts exemplary embodiments of a computer-based system, which may be utilized for capturing business event information for business events that occur during business processes, and for translating the captured business event information into a final event records all formatted according to a common data structure. The system may include a user's computing device 30, one or more business servers 32, and a communications network 34. In some embodiments, the various processes, functions, and features of certain embodiments discussed herein may be performed in part (or entirely) by the user's computing device 30 and/or in part (or entirely) by the business servers 32.

In certain embodiments, the business servers 32 may facilitate the various elements of the Business Event Management Framework 5 of FIG. 1A(ii). For example, one or more of the business servers 32 may host the Source Platform 7, including one or more of the Source Applications. As discussed previously, the Source Applications may comprise computer programs configured to be executed so as to make available business processes that can be performed by a user. For example, the business servers 32 may store a first Source Application configured to make available a first business process, as well as a second Source configured to make available a second business process. The business servers 32 may store other Source Applications as well. The Source Applications, once executed, may provide for the business processes to be accessible to a user via the user's computing device 30, such as by way of data communication between the user's computing device 30 and the business server 32 over the communications network 34. As was described previously, however, some business processes may be performed via telephone, face-to-face meeting, and/or directly in-person. As such, in some embodiments, a user may perform a business process without a computing device 30 or with devices other than a computing device 30.

In more detail, a business process may be provided by a Source Application that is embodied as computer program and/or software stored on and made available for execution by one or more of the business servers 32. As illustrated in FIG. 1A(ii), in some embodiments, the Source Application may be part of the Source Platform 7, which may itself be provided via one or more of the business severs 32. Regardless, a user may access and perform the business process by connecting (e.g., over the communications network 34) with the business servers 32 via the user's computing device 30. With the user's computing device 30 connected with the business servers 32, the Source Application may be executed such that the business process is made available to the user via the user's computing device 30. For instance, the user may access the one or more business processes by connecting with the business servers 32 over the Internet via a web browser of the user's computing device 30. In some alternative embodiments, however, the user's computing device 30 may be configured to store and execute the Source Application, e.g., as a downloaded application or mobile app., so as to make the business processes available to the user directly form the user's computing device 30. Regardless of the location of the Source Application, certain embodiments provide for the user's computing device 30 to be in communication with the business servers 32, via the Source Application and/or the Integration Application (described in more detail below), over the communications network 34, such that the business servers 32 may be configured to capture and/or receive business event information for each business event that occurs as the user performs a business process.

Figure 3:
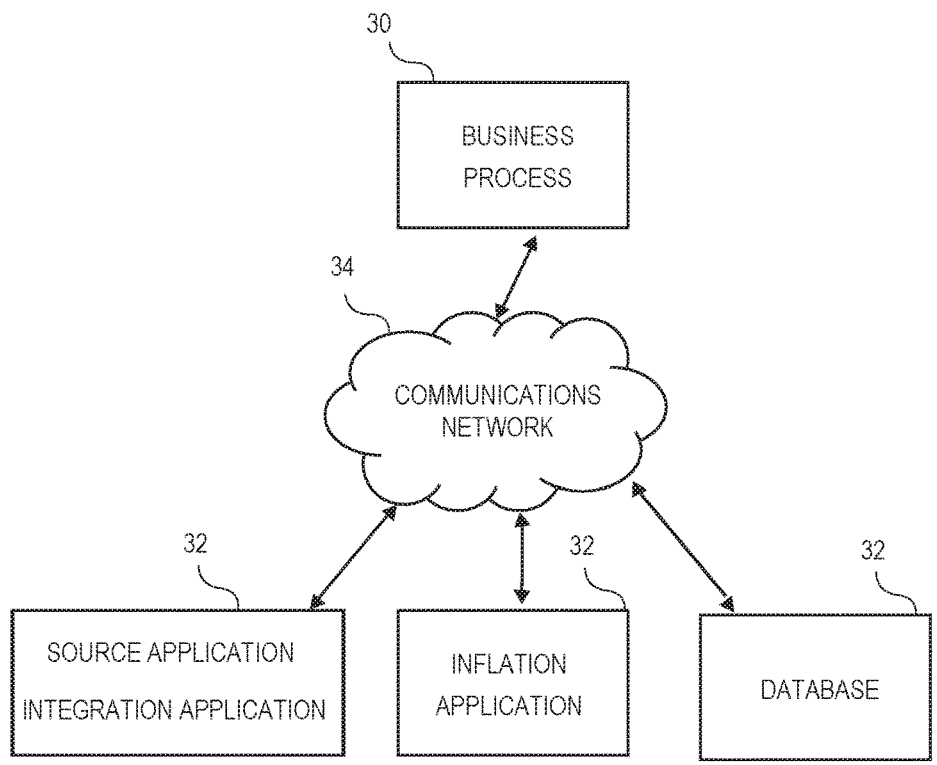
FIG. 3 illustrates an additional embodiment of various components of an exemplary computer system for obtaining information from business events shown in schematic form.

FIG. 3 illustrates an exemplary embodiment in which the Source Application is stored on and executed from one or more business server 32 so as to allow a business process to be accessed from a user's computing device 30. In particular, the user's computing device 30 may access the business server 32 over the communications network 34 such that the Source Application may be executed to make the business process available to the user over the user's computing device 30. As the user performs the business process, certain embodiments additionally provide for business event information related to business events that occur during the business process to be captured. In some embodiments, the Source Application will be configured to capture business event information for business events that occur. In other embodiments, the Integration Application may capture such business event information.

In more detail, some embodiments may provide for business servers 32 to include, in addition to the Source Application, an Integration Application, which also may be incorporated within the Source Platform 7. As will be described in more detail below, the Integration Application may be configured to enhance/enrich the data of the business event information (e.g., via the Data Services component), as well as to direct the business event information to appropriate applications or locations. In some embodiments, the Integration Application may also be configured to capture business event information (e.g., from the Source Application) as the user performs the business process. Regardless, the Integration Application may be embodied as computer programs and/or software stored on and executed by one or more of the business servers 32. In some embodiments, the Integration Application may be stored on the same business server 32 as the Source Application. In some embodiments, the Integration Application may be comprised as part of the Source Application. In other embodiments, the Integration Application may comprise a computer program and/or software that is independent from the Source Application. Nevertheless, certain embodiments provide for the Integration Application, and/or the Source Application, to be configured to capture business event information, including B/E identification information and B/E process information, for each of the business events that occur during performance of a business process.

Remaining with FIG. 3, some embodiments may also provide for one or more of the business servers 32 to include the Inflation Application, which is incorporated within the Source Platform 7 of the Business Event Management Framework 5 of FIG. 1A(ii). The Inflation Application may be configured to translate the captured business event information into final event records formatted according to the common data structure. The Inflation Application may be embodied as a computer program and/or software stored on and executed by the business servers 32. Once the final event records have been generated by the Inflation Application, embodiments may further provide for one or more of the business servers 32 to include one or more databases in which the final event records may be stored for analysis and future use. For example, as illustrated in FIG. 1A(ii), the Business Event Management Framework 5 (as provided by one or more business servers 32) may include the EIDC 9, which provides one or more databases, such as the Source Directory database and the Common Directory database. Each of such databases is configured to store final event records (or portions thereof) that are received from the Source Platform 7.

Figure 4:
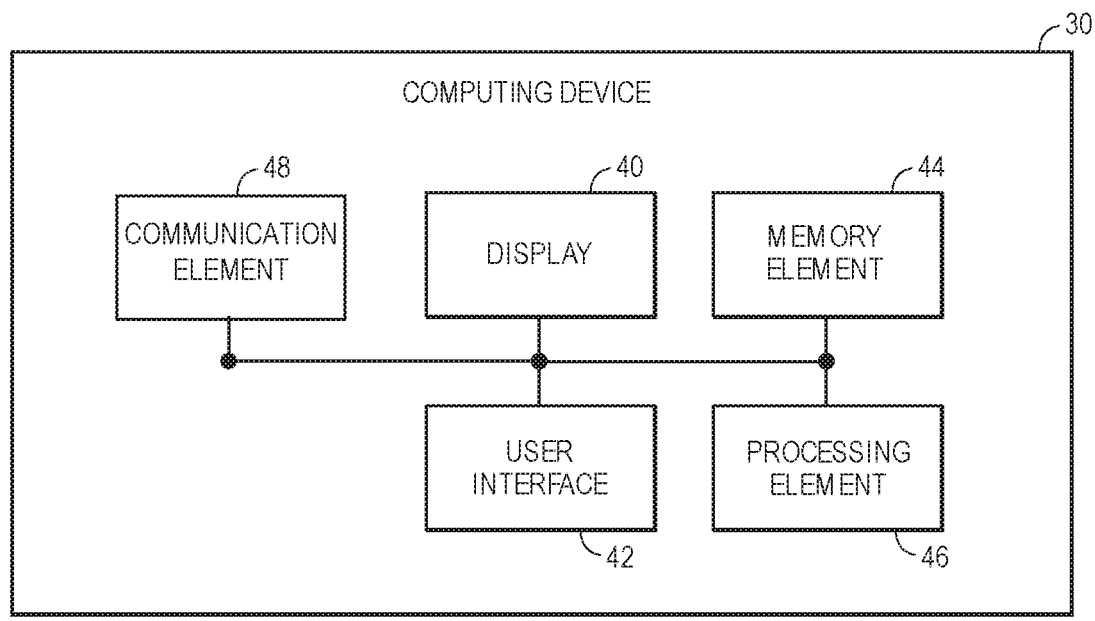
FIG. 4 illustrates various components of an exemplary computing device shown in block schematic form.

FIG. 4 depicts one embodiment of an exemplary computing device 30 for use by a user in accessing and carrying out one or more of the business processes. The user's computing device may be embodied as a personal computer, such as a desktop workstation and/or laptop computer, smartphone, a tablet computer, phablet, wearable electronics, or the like, and may, as illustrated in FIG. 4, broadly comprise a display 40, a user interface 42, a memory element 44, and a processing element 46. The computing device 10 may also include a communication element 48 configured as one or more wired or wireless transceivers that communicate with other devices, systems, or networks. The communication element 48 may include signal or data transmitting and receiving circuits, such as antennas, transceivers, amplifiers, filters, mixers, oscillators, digital signal processors (DSPs), and the like. The communication element 48 may establish communication wirelessly by utilizing RF signals and/or data that comply with communication standards such as cellular 2G, 3G, or 4G, IEEE 802.11 standard such as WiFi, IEEE 802.16 standard such as WiMAX, Bluetooth™, or combinations thereof. Alternatively, or in addition, the communication element 48 may establish communication through connectors or couplers that receive metal conductor wires or cables which are compatible with networking technologies such as ethernet. In certain embodiments, the communication element 48 may also couple with optical fiber cables. The communication element 48 may be in communication with or electronically coupled to memory element 44 and/or processing element 46.

The display 40 may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, heads-up displays (HUDs), or the like, or combinations thereof. The display 40 may include a screen on which the information is presented, with the screen possessing a square or a rectangular aspect ratio that may be viewed in either a landscape or a portrait mode. In various embodiments, the display 40 may also include a touch screen occupying the entire screen or a portion thereof so that the display 40 functions as part of the user interface 42. The touch screen may allow the user to interact with the computing device 30 by physically touching, swiping, or gesturing on areas of the screen.

The user interface 42 generally allows the user to utilize inputs and outputs to interact with the computing device 30. Inputs may include buttons, pushbuttons, knobs, jog dials, shuttle dials, directional pads, multidirectional buttons, switches, keypads, keyboards, mice, joysticks, microphones, or the like, or combinations thereof. Outputs may include audio speakers, lights, dials, meters, printers, or the like, or combinations thereof. With the user interface 42, the user may be able to control the features and operation of the display 40. For example, the user may be able to zoom in and out on the display 40 using either virtual onscreen buttons or actual pushbuttons. In addition, the user may be able to pan the image on the display 40 either by touching and swiping the screen of the display 40 or by using multidirectional buttons or dials.

The memory element 44 may include one or more electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 44 may be embedded in, or packaged in the same package as, the processing element 46. The memory element 44 may include, or may constitute, a "computer-readable medium." The memory element 44 may store the instructions, code, code segments, software, firmware, programs, applications, apps, services, daemons, or the like that are executed by the processing element 46.

The processing element 46 may include one or more electronic hardware components such as processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 46 may generally execute, process, or run instructions, code, code segments, software, firmware, programs, applications, apps, processes, services, daemons, or the like. The processing element 46 may also include hardware components such as finite-state machines, sequential and combinational logic, and other electronic circuits that may perform the functions necessary for the operation of the current invention. The processing element 46 may be in communication with the other electronic components through serial or parallel links that include address busses, data busses, control lines, and the like.

Turning to the business servers 32 of the present embodiments, such business servers 32 may be embodied by one or more personal computers such as desktop workstations and/or laptop computers, and/or by application servers, database servers, file servers, gaming servers, mail servers, print servers, web servers, or the like, or combinations thereof. Furthermore, the business servers 32 may include a plurality of servers, virtual servers, or combinations thereof. The business servers may be configured to include or execute computer programs and software such as file storage applications, database applications, email or messaging applications, web server applications, or the like, in addition to and/or in conjunction with the computer program and/or software described elsewhere herein (e.g., the source application, the integration application, and/or the inflation application).

Figure 5:
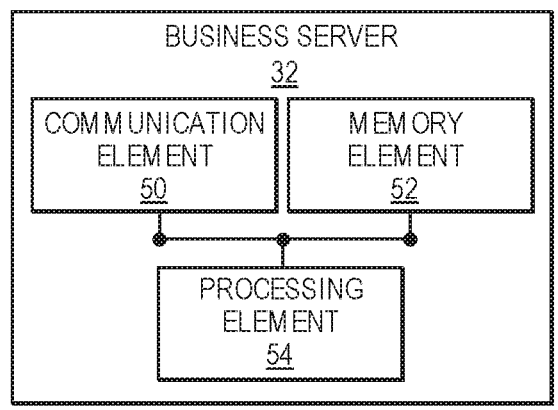
FIG. 5 illustrates various components of an exemplary business server shown in block schematic form.

The business servers 32 may, as illustrated in FIG. 5 include a communication element 50, a memory element 52, and a processing element 54. The communication element 50 generally allows communication with external systems or devices and/or between the one or more individual business servers. The communication element 50 may include signal or data transmitting and receiving circuits, such as antennas, transceivers, amplifiers, filters, mixers, oscillators, digital signal processors (DSPs), and the like. The communication element 50 may establish communication wirelessly by utilizing RF signals and/or data that comply with communication standards such as cellular 2G, 3G, or 4G, IEEE 802.11 standard such as WiFi, IEEE 802.16 standard such as WiMAX, Bluetooth™, or combinations thereof. Alternatively, or in addition, the communication element 50 may establish communication through connectors or couplers that receive metal conductor wires or cables which are compatible with networking technologies such as ethernet. In certain embodiments, the communication element 50 may also couple with optical fiber cables. The communication element 50 may be in communication with or electronically coupled to memory element 52 and/or processing element 54.

The memory element 52 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory element 52 may include, or may constitute, a "computer-readable medium". The memory element 52 may store the instructions, code, code segments, software, firmware, programs, applications, apps, services, daemons, or the like that are executed by the processing element 54. The memory element 52 may also store settings, data, documents, sound files, photographs, movies, images, databases, and the like.

The processing element 54 may include processors, microprocessors, microcontrollers, DSPs, field-programmable gate arrays (FPGAs), analog and/or digital application-specific integrated circuits (ASICs), or the like, or combinations thereof. The processing element 54 may generally execute, process, or run instructions, code, code segments, software, firmware, programs, applications, apps, processes, services, daemons, or the like. The processing element 54 may also include hardware components, such as finite-state machines, sequential and combinational logic, and other electronic circuits that may perform the functions necessary for the operation of embodiments of the current inventive concept. The processing element 54 may be in communication with the other electronic components through serial or parallel links that include address busses, data busses, control lines, and the like.

The communications network 34 may generally allow communication between the user's computing device 30 and the business servers 32 (and/or between individual business servers 32), such as via wireless communication or data transmission over one or more radio links or wireless communication channels. The communications network 34 may include local area networks, metro area networks, wide area networks, cloud networks, the Internet, cellular networks, plain old telephone service (POTS) networks, and the like, or combinations thereof. The communications network 34 may be wired, wireless, or combinations thereof and may include components such as modems, gateways, switches, routers, hubs, access points, repeaters, towers, and the like. The computing device 30 and/or the business servers 32 may connect to the communications network 34 wirelessly, such as radio frequency (RF) communication using wireless standards such as cellular 2G, 3G, or 4G, Institute of Electrical and Electronics Engineers (IEEE) 802.11 standards such as WiFi, IEEE 802.16 standards such as WiMAX, Bluetooth®, or combinations thereof.

The various processes, functions, and features of the present embodiments discussed herein may be performed by the processing element 46 of the user's computing device 30 carrying out instructions of a computer program, software, firmware, or combinations thereof stored on the memory element 44. In some embodiments, the computer program may be in the form of a mobile "app." Alternatively, the various processes, functions, and features of the present embodiments discussed herein may be performed by the processing elements 54 of the business servers 32 carrying out instructions of a computer program, software, firmware, or combinations thereof stored on the memory element 52. For example, the business servers 32 may be configured generally to store and execute one or more of the computer programs and/or software described herein (e.g., the source application, the integration application, and/or the inflation application), to retain electronic data, to respond to requests to retrieve data, as well as to store data. In some embodiments, the business servers 32 may perform certain of the processes, functions, and features described herein by executing portions, or the entirety, of the computer program and/or software of the present embodiments, while the computing device 30 may perform other of the processes, functions, and features described herein by executing portions, or the entirety, of the computer program and/or software of the present embodiments.

Exemplary Embodiments of the Common Data Structure

As discussed above, the present embodiments may be configured to capture business event information as business events occur during the performance of a business process. Such business event information may include (1) B/E identification information, which may comprise information/data representative of the business event, and (2) B/E process information, which may comprise information/data relevant to the business process at the time the business event occurred. Upon capturing the business event information, some embodiments are configured to translate the raw data of the business event information into a final event record that is formatted according to a common data structure.

In more detail, final event records of the present embodiments may comprise data files, such as an extensible markup language (XML) files, formatted according to a common data structure and that are representative of the captured business event information. A final event record formatted according to the common data structure may include (1) an event metadata section configured to include event metadata representative of captured B/E identification information for the business event, and (2) one or more payload sections that may include captured data representative of the B/E process information that is relevant to the business process at the time the business event occurred.

The event metadata included in the event metadata section may comprise, at least, a "unique identifier," which may be a durable key generated and assigned to the final event record to identify the business event for which the final event record is the subject. The unique identifier may comprise a numeric, alphabetic, or alphanumeric string that is used to permanently identify a business event and/or a corresponding final event record. In addition to the unique identifier, some embodiments may provide for the event metadata included in the event metadata section to also include:

- an "event type name," which comprises an alphanumeric string describing the type of business event that has been captured;
- an "event type version," which comprises an alphanumeric string indicating a version of the event type;
- an "event indicator," which comprises an alphabetic letter indicative of how the business event was determined. Event indicators may include—
  - "D" for "derived," which is indicative of the business event being inferred based upon data or changes in data occurring during the business process,
  - "R" for "raw," which is indicative of the business event being recognized as a known, significant event that occurs within the business process,
  - "S" for "synthetic," which is indicative of the business event being inferred based upon one or more correlation rules being satisfied during or after execution of the business process, and
  - "T" for "test in production," which is indicative of the business event being generated as a result of the business process being tested;
- a "producer process identifier," which comprises an alphanumeric string indicative of the source application that provides the business process and/or that captures the business event information;
- an "occurrence timestamp," which comprise an alphanumeric timestamp indicative of the date and time when the business event occurred;
- a "recorded timestamp," which comprise an alphanumeric timestamp indicative of the date and time when the business event information was translated into the final event record; and
- a "context name," which comprise an alphanumeric string providing a description of any necessary context associated with the business event.

The common data structure of the final event record may also include the one or more payload sections that contain collected data representative of the B/E process information that is relevant to the business process at the time the business event occurred. The payload sections may each comprise sets of one or more alphanumeric strings of data. The number, the types, and the formats of payload sections may be selected as desired and/or required for future analysis and use of the final event records. However, in some embodiments, the particular number, types, and/or format of payload sections should be permanently defined, such that the format of the common data structure of the final event records can be consistently analyzed and compared regardless of the type of business event or of the particular business process from which the business event information was obtained. Examples of such payload sections that may be included within the common data structure of the final event record may include:

- a "business process payload," which includes one or more alphanumeric strings related to the particular business process from which the business event was captured;
- a "sessions payload," which includes one or more alphanumeric strings related to the particular session of the business process from which the business event was captured;
- a "customer payload," which includes one or more alphanumeric strings related to the particular customer-type user that is performing the business process;
- an "associate payload," which includes one or more alphanumeric strings related to any associate-type users that may be assigned to the business process;
- an "agreement payload," which includes one or more alphanumeric strings related to any agreements that may be associated with the business process;
- an "agreement request payload," which includes one or more alphanumeric strings related to any request for agreements that may occur during the business process;
- an "offer payload," which includes one or more alphanumeric strings related to any offers made during the business process;
- a "product payload," which includes one or more alphanumeric strings related to any business products associated with the business process;
- a "risk payload," which includes one or more alphanumeric strings related to any risks associated with any risks associated with the business process;

a "bill payload," which includes one or more alphanumeric strings related to any bill information or billing account associated with the business process;

a "payment payload," which includes one or more alphanumeric strings related to any payment transactions associated with the business process;

a "rule payload," which includes one or more alphanumeric strings related to any rules associated with the business process;

a "signature payload," which includes one or more alphanumeric strings related to any electronic signatures associated with the business process;

a "document payload," which includes one or more alphanumeric strings related to any documents associated with the business process;

a "communication payload," which includes one or more alphanumeric strings related to any communication information associated with the business process;

a "claim payload," which includes one or more alphanumeric strings related to any claims associated with the business process; and a "synthetic event payload," which includes one or more alphanumeric strings related to information associated with synthetic events captured during the business process.

As noted above, the particular number, types, and formats of the payload sections within the common data structure of the final event records may be selected as necessary to maximize the usefulness of the final event records for future analysis. However, once the particular number, types, and formats of the payload sections within the common data structure have been determined, such format may be consistently maintained in the conformed or standardized format. As such, the common data structure enables correlation and analysis of business events across various business process and multiple Source Applications. In general, it may be preferable to have a large number of payload sections included within the common data structure, such that the common data structure is configured to represent a significant amount of data across a wide range of subject matter. As such, business event information from a wide range of business events captured across disparate business processes may be stored in final event records all having a common data structure.

It should be understood, however, in embodiments in which the number of payload sections used in the common data structure is large, not every final event record will necessarily use each available payload section. For example, if a business event is captured from a particular business process that does not involve the use of electronic signatures, then the final event record generated for the business event would not populate the "signature payload." Nevertheless, the final event record would still include the final event payload (e.g., filled with null data), so as to maintain the required consistency with the common data structure.

Exemplary Embodiment of a Business Event Capture and Translation into a Final Event Record The following is an exemplary embodiment of systems and methods for capturing business event information for a business event that occurs during a business process and for translating the captured business event information into a final event record conforming to a standardized, common data structure. With reference to FIGS. 1A(ii) and 3, one or more of the business servers 32 may implement the Business Event Management Framework 5. As previously discussed, the Business Event Management Framework 5 may provide the Source Platform 7 that includes the Source Application.

The Source Application is configured to make available a business process for a user to access and perform via the user's computing device 30. The flowchart of FIG. 1B illustrate the steps of an exemplary business process 10 for acquiring an insurance product. A user may access the business process 10 by connecting the user's computing device 30 with the business server 32 over the communications network 34, such as by launching a web browser on the user's computing device 10, and entering a URL that directs the web browser to the Internet location from which the business process 10 is made available via execution of the Source Application from the one or more business servers 32 that provide the Business Event Management Framework 5.

Once the user has access to the business process 10, the user may perform the business process 10 by progressing through the steps of the business process 10 using the user's computing device 30. As the user progresses through the business process 10, the present embodiments may be configured to capture business event information related to various business events that may occur during the business process 10. In some embodiments, the business event information may be captured directly by the Source Application. In other embodiments, the business event information may be captured by the Integration Application. Regardless, the present embodiments provide for the Source Application and/or the Integration Application to be configured to capture the business event information for each business event that occurs during the business process 10. In certain embodiments, the Source Application and/or the Integration Application may be configured to capture business event information in real time, at each moment that a business event occurs.

In embodiments in which the Integration Application is separate from the Source Application, to effect such a real time capture of information, the Integration Application may be in continuous communication with the Source Application so as to quickly determine when business events occur and when to capture associated business event information. As such, the Integration Application may be configured to capture the business event information from the Source Application in real time as business events occur. In alternative embodiments, the Source Application may be configured to send the business event information to the Integration Application as business events occur. Regardless, the business event information captured and/or received by the Integration Application may comprise raw data associated with the business events that occur during the business process 10, with such business event information including: (1) B/E identification information, which is information/data that is representative of the particular business event, and (2) B/E process information relevant to the business process at the time the business event occurred Upon capturing and/or receiving business event information for a particular business event, the Integration Application may enhance or enrich the business event information, such as via the Data Services program. In addition, the Integration Application may make a call to the Inflation Application. As discussed previously, the Inflation Application may form part of the Source Platform 7 of the Business Event Management Framework 5 provided by one or more of the business servers 32. In some embodiments, the Inflation Application may be independent from the Integration Application. By being an independent application, the Inflation Application may be configured to perform its functions for various other business processes that are made available by other source applications. Regardless, the present embodiments may provide for the Inflation Application to translate the captured business event information into a final event record that is formatted according to a common data structure. In some embodiments, the Inflation Application may first validate the captured business event information to ensure (1) that there are no errors, (2) that it includes all expected or required information, and (3) that it conforms to defined data types for the final event record.

Upon such validation, the Inflation Application will translate the business event information into the final event record, which as described previously, includes (1) an event metadata section configured to include event metadata representative of captured B/E identification information, and (2) one or more payload sections that include captured data representative of the B/E process information. The event metadata may include, at least, a unique identifier, which is generate by the Inflation Application and assigned to the final event record as representing the business event for which the business event information was captured. The event metadata may also include portions of the B/E identification information that are translated by the Inflation Application into metadata that is formatted consistent with the common data structure, as was described in the preceding section. Such event metadata may, thus, be populated into the event metadata section of the final event record.

Furthermore, the Inflation Application may translate the B/E process information into common data that is formatted according to the common data structure, with such data being populated into the payload sections. As such, the resulting event metadata included in the event metadata section and the data included in the payload sections, are all formatted according to the common data structure, which will form the final event record. Upon creating the final event record, in some embodiments, the Inflation Application may scan the final event record for errors. If any errors are found, the Inflation Application may correct the errors so that the final event record is properly formatted.

Once the final event record is created by the Inflation Application, the final event record may be passed from the Inflation Application to the Integration Application. In some embodiments, the Integration Application may also scan the final event record for errors. In such embodiments, if any errors are found, the Integration Application may, with assistance from the Inflation Application, correct the errors so that the final event record is properly formatted for storage and analysis. If no errors are found, or once the errors are corrected, the Integration Application may transmit the final event record to the databases of the EIDC 9 for storage and analysis.

As discussed previously, the business servers 32 may provide one or more databases for storing final event records. Specifically, the Business Event Management Framework 5, as provided by the one or more business servers 32, may include the EIDC 9 that provides, in some embodiments, the Source Directory database and the Common Directory database illustrated in FIG. 1A(ii). In some embodiments, the databases provided by the EIDC 9, including the Source Directory database and the Common Directory database, may be configured as a database cluster distributed across one or more business servers 32. In some specific embodiments, the databases may be configured as a Hadoop® cluster so as to enhance the speed and efficiency of analyzing the final event records stored therein.

In some embodiments, Apache's Kafka® program may be used to distribute the final event records from the Integration Application to the databases for storage. Regardless, in certain embodiments, as shown in FIG. 1A(ii), the Source Directory database may be used to store the entirety of each final event record. As such, the Business Event Management Framework 5 provides a "snapshot" of business events that are passed from the Source Platform 7 to the EIDC 9, with the snapshot being in the form of the final event record that comprises the event metadata section (which includes the B/E identification information for the business event) and the payload section (which includes the B/E process information for the business event). In some embodiments, the EIDC 9 may provide for the final event records to be validated and/or checked for errors before being stored in the Source Directory database.

In additional embodiments, the payload sections of the final event records may be removed from the final event records, such that the remaining event metadata contained within the metadata sections of the final event records may be stored as business event metadata records in the Common Directory database. In some embodiments, the EIDC 9 may provide for the business event metadata records to be validated and/or checked for errors before being stored in the Common Directory database In some embodiments, the Source Directory database may have restricted access, such that only the Source Application from which the final event record was created (or the business entity that owns/controls the Source Application) may have access to the Source Directory database for purposes of analyzing the entirety of the final event records. As such, other entities (which do not own or control the Source Application) may not be provided with access to the Source Directory database and the entirety of the final event records stored therein. In contrast, the Common Directory database may not have such an access restriction, such that any entity may access the business event metadata records stored in the Common Directory database.

In some embodiments, entities may be required to subscribe to the Common Directory database in order to obtain access to such records. For example, after a subscription, embodiments may provide for the records included within the Common Directory database to be automatically published to the other entities for use and analysis. As such, embodiments allow for consumption of the data included within the final event records (or portions thereof), which correspond with captured business events, at multiple points across an architecture (e.g., via synchronous, asynchronous, and/or batch/bulk consumption techniques). Furthermore, whether in the Source Directory database or the Common Directory database, final event records or business event metadata records, which represent captured business event information for business events, can be captured once but used for analysis multiple times based on business requirements.

In view of the above, the present embodiments provide for information related to business events that occur during execution of a business process to be captured in real time and to be translated into a final event record formatted according to a common data structure. As such, final event records may be stored in databases in a format that facilitates comprehensive and efficient analysis. Although the above-described exemplary embodiment illustrated the capture, translation, and storage of business event information for an illustrative business event that occurred during the business process 10, embodiments may be used in relation to any business event that occurs during the business process 10.

Furthermore, business event information may be captured, translated, and stored for business event that occur across a wide range of business processes. For instance, the business process 10 discussed above and illustrated in FIG. 1, is illustrative of an insurance product acquisition. However, the present embodiments may be used to capture, translate, and store business event information for business events that occur during other types of business processes, such as insurance product change requests, insurance product renewals, and insurance product closures. Furthermore still, the present embodiments may be used to capture, translate, and store business event information for business events relating to non-insurance business processes. In general, the present embodiments may be used to capture, translate, and store business event information for business events that occur during generally any type of business process that involves a user interacting with the business process.

Beneficially, because the final event records generated and stored by the present embodiments may be formatted according to the common data structure, such final event records may be analyzed and compared even if the individual final event records are related to distinct business events and/or are obtained from disparate business processes. As such, the final event records may be analyzed for purpose of, inter alia, (1) sharing information between business processes, (2) improving the efficiency/functionality of business processes, (3) predicting customer behaviors and business needs, and/or (4) generally improving business entities' business processes. As a specific example, during the business process 10 of FIG. 1 for acquiring an insurance product, business event information for the business event of presenting the user with a price quote (i.e., See Quote 20) may be captured for each user that performs the business process 10.

If the final event reports generated for such business event indicates that a high percentage of users exit out of the business process 10 after viewing the price quote, then an analysis may indicate that the business process 10 may need to be improved or otherwise changed. For instance, it may be determined that the price quotes are too high, such that the algorithm for determining the price quotes may need to be modified. If other business processes use a similar process for presenting price quotes, an analysis of final event records for the business process 10 may indicate that such process for the other business processes may need to be similarly changed.

As an additional example, a final event record may be generated based upon a business event of a user making a change to the user's vehicle insurance policy. In particular, the user may be performing a business process in the form of a vehicle insurance product change request. During the performance of such business process, the user may indicate that the user was recently married and, thus, needs to add the user's marriage partner as an additional insured on the user's vehicle insurance policy. Certain embodiments may analyze the final event record associated with such business event, and determine that the user also has a life insurance policy. As such, based upon the analysis of the final event record related to the change of the user's vehicle insurance policy, embodiments may determine that the user also likely needs to make a change to the user's life insurance policy. Because embodiments provide for the capture, translation, storage, and analysis of the business event information and/or final event records to occur in real time, embodiments may be configured to prompt the user to make the change to the user's life insurance policy (e.g., via a separate business process directed to a life insurance product change request) as the user is currently progressing through the vehicle insurance product change request business process.

Noted above, information related to business events that occur during execution of a business process may be captured in real time, and translated into a final event record formatted according to a common data structure. In some embodiments, the business events may relate to certain "life events," such as birth of a child, marriage, divorce, death, moving to a new home or apartment, moving to new state, taking a trip or vacation, graduating high school or college, etc. The life events may be detected automatically, such as by monitoring a customer's data (e.g., mobile device or smart home or vehicle data), with their affirmative permission or consent, such as after opt-in into a program that rewards risk averse behavior with insurance or other cost-savings. Additionally, or alternatively, the customer may provide a service provider (such as an insurance or financial institution) with notification of the life event. After determining a life event has occurred, information related to the life event may be captured and ultimately translated into a final event record formatted with a common data structure to facilitate present or subsequent analysis. The life events may lead to increased, decreased, or different insurance needs in some situations, such as increased need for life insurance if a birth of a child or marriage has occurred, new need for auto or homeowner's if a vehicle or home is purchased, or a need for changes in certain insurance coverages if one moves to a different state. Other life events may be considered as business events, including those discussed elsewhere herein.

Exemplary Computer-Implemented Method

Figure 6:
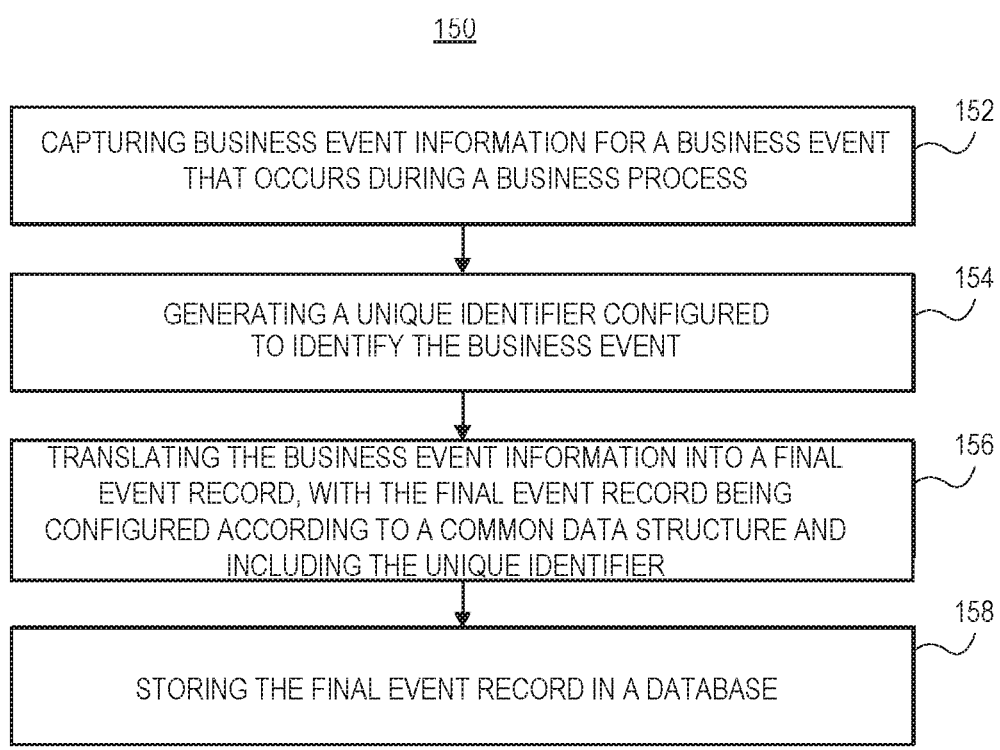
FIG. 6 illustrates an exemplary computer-implemented method for obtaining business events from a business process in accordance with aspects of the present embodiments.

FIG. 6 depicts an exemplary computer-implemented method 150 for obtaining information related to a business process. The steps may be performed in the order shown in FIG. 6, or they may be performed in a different order. Furthermore, some steps may be performed concurrently as opposed to sequentially. In addition, some steps may be optional. The steps of the computer-implemented method may be performed by a processing element of the user's computing device, by a processing element of the business server, and/or one or more local or remote processors.

A first step 152 of the method 150 may include capturing, via one or more processing elements, business event information for a business event that occurs during the business process. The business information may include (1) B/E identification information, which is information/data that is representative of the particular business event, and (2) B/E process information, which is information/data relevant to the business process at the time the business event occurred.

A next step 154 of the method 150 may include generating, via one or more processing elements, a unique identifier configured to identify the business event. The unique identifier may be an alphanumeric string that uniquely identifies the business event and/or the final event report.

A next step 156 of the method 150 may include translating, via one or more processing elements, the business event information into a final event record, with the final event record being formatted according to a common data structure, and with the final event record including the unique identifier. In some embodiments, the common data structure may include (1) an event metadata section configured to include event metadata representative of captured B/E identification information, and (2) one or more payload sections that include captured data representative of the B/E process information. A next step 158 may include storing the final event record in a database. The flow of FIG. 6 may include additional, less, or alternate actions, including those discussed elsewhere herein.

Another Exemplary Computer-Implemented Method

Figure 7:
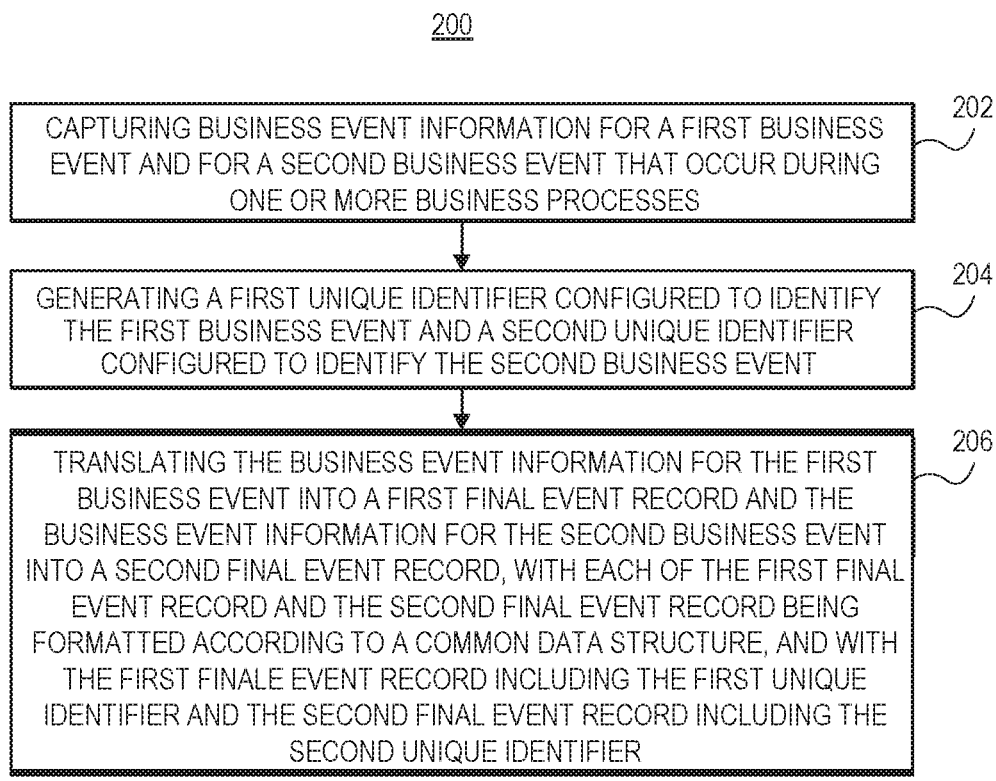
FIG. 7 illustrates an additional exemplary computer-implemented method for obtaining business events from a business process in accordance with aspects of the present embodiments.

FIG. 7 depicts another exemplary computer-implemented method 200 for obtaining information related to one or more business processes. The steps may be performed in the order shown in FIG. 7, or they may be performed in a different order. Furthermore, some steps may be performed concurrently as opposed to sequentially. In addition, some steps may be optional. The steps of the computer-implemented method may be performed by a processing element of the user's computing device, by a processing element of the business server, and/or one or more local or remote processors.

A first step 202 of the method 200 may include capturing, via one or more processing elements, business event information for a first business event and for a second business event that occur during one or more business processes. In some embodiments, the first business event may occur during a first business process made available by a first source application, and the second business event may occur during a second business process made available by a second source application. In other embodiments, the first business process and the second business process may be the same, such that the first business event and the second business event are captured from the same business process made available by the same source application.

A next step 204 of the method 200 may include generating, via one or more processing elements, a first unique identifier configured to identify the first business event and a second unique identifier configured to identify the second business event. A next step 206 of the method 200 may include translating, via one or more processing elements, the business event information for the first business event into a first final event record and the business event information for the second business event into a second final event record. Each of the first final event record and the second final event record may be configured according to a common data structure. The first final event record may include the first unique identifier, and the second final event record may include the second unique identifier. The flow of FIG. 7 may include additional, less, or alternate actions, including those discussed elsewhere herein.

Exemplary Computer Systems

In one aspect, a computer system configured to obtain information related to a business process may be provided. The computer system may include one or more processors, servers, transceivers, configured to: (1) capture business event information for a business event that occurs during the business process; (2) generate a unique identifier configured to identify the business event; (3) translate the business event information into a final event record, with the final event record being configured according to a common data structure, and with the final event record including the unique identifier; and/or (4) store the final event record in a database.

In another aspect, a computer system configured to obtain information related to a business process may be provided. The computer system may include one or more processors, servers, and/or transceivers configured to: (1) capture business event information for a first business event that occurs during the business process, and for a second business event that occurs during the business process; (2) generate a first unique identifier configured to identify the first business event, and a second unique identifier configured to identify the second business event; and (3) translate the business event information for the first business event into a first final event record, and the business event information for the second business event into a second final event record, with each of the first final event record and the second final event record being configured according to a common data structure, and with the first final event record including the first unique identifier and the second final event record including the second unique identifier.

In another aspect, a computer system configured to obtain information related to one or more business processes may be provided. The computer system may include one or more processors, sensors, transceivers, and/or servers configured to: (1) capture business event information for a first business event and for a second business event, wherein each business event occurs during the one or more business processes; (2) generate a first unique identifier configured to identify the first business event, and a second unique identifier configured to identify the second business event; and (3) translate the business event information for the first business event into a first final event record, and the business event information for the second business event into a second final event record, with each of the first final event record and the second final event record being configured according to a common data structure, and with the first final event record including the first unique identifier, and the second final event record including the second unique identifier.

The foregoing computer systems may include additional, less, or alternate functionality, including that discussed elsewhere herein.

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology may include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

We claim:

1. A computer-implemented method for obtaining information related to a business process, the computer-implemented method comprising:
    capturing, via a processor and in a first file having a first format, first event information indicative of a first interaction with the business process via a first source application;
    extracting, via the processor and from the first file, first values from a data field having a first data field type, the first values characterizing the first interaction;
    capturing, via the processor and in a second file having a second format different from the first format, second event information indicative of a second interaction with the business process via a second source application;

extracting, via the processor and from the second file, second values from a data field having the first data field type, the second values characterizing the second interaction;

generating, via the processor, a first event record including:
the first values formatted according to a common data structure,
an indicator of the first data field type in association with the first values, and metadata indicating the first source application, wherein the metadata further comprises:
an indication of a type of communication channel used for the first interaction, and an indication of how the first interaction was inferred based upon one of: a change in data occurring during the first interaction, detection of a known event, or a result of testing the business process;

generating, via the processor, a second event record including:
the second values formatted according to the common data structure,
an indicator of the first data field type in association with the second values, and metadata indicating the second source application; and storing, via the processor, the first event record and the second event record in a database.

2. The computer-implemented method of claim 1, wherein the communication channel is one of: telephone, mail, email, text, web interface, mobile app, or online chat.

3. The computer-implemented method of claim 1, wherein the first event record and the second event record each comprise an extensible markup language (XML) file.

4. The computer-implemented method of claim 1, further comprising:
assigning, via the processor, a first unique identifier to the first event record, the first unique identifier indicating a first type of business event;
augmenting, via the processor, the first event record to include metadata indicating the first unique identifier;
assigning, via the processor, a second unique identifier to the second event record, the second unique identifier indicating a second type of business event; and
augmenting, via the processor, the second event record to include metadata indicating the second unique identifier.

5. The computer-implemented method of claim 4, wherein the business event comprises one of: a transaction, an agreement, a change in customer information, a customer life event, or a price calculation.

6. The computer-implemented method of claim 1, wherein:
the business process is provided by the first source application and the second source application, and
the business process is made available by a business server.

7. The computer-implemented method of claim 1, wherein the business process is a first business process, the method further comprising:
generating, via the processing, a third event record corresponding to an interaction with a step of a second business process, different from the first business process, wherein the third event record includes third values formatted according to the common data structure; and storing, via the processor, the third event record in the database.

8. The computer-implemented method of claim 1, further comprising:
providing, via the processor, the first event record and the second event record as inputs to a machine learning algorithm, the machine learning algorithm determining a pattern based at least in part on the first event record and the second event record; and
outputting, via the processor and in a report associated with the business process, the determined pattern.

9. A tangible non-transitory computer-readable medium storing instructions for obtaining information related to a business process that, when executed by at least one processor of a computer system, causes the computer system to:
capture, in a first file having a first format, first event information indicative of a first interaction with the business process via a first source application;
extract, from the first file, first values from a data field having a first data field type, the first values characterizing the first interaction;
capture, in a second file having a second format different from the first format, second event information indicative of a second interaction of the business process via a second source application;
extract, from the second file, second values from a data field having the first data field type, the second values characterizing the second interaction;
generate a first event record including:
the first values formatted according to a common data structure,
an indicator of the first data field type in association with the first values, and metadata indicating the first source application, wherein the metadata further comprises:
an indication of a type of communication channel used for the first interaction, and an indication of how the first interaction was inferred based upon one of: a change in data occurring during the first interaction, detection of a known event, or a result of testing the business process;
generate a second event record including:
the second values formatted according to the common data structure,
an indicator of the first data field type in association with the second values, and metadata indicating the second source application; and
store the first event record and the second event record in a database.

10. The tangible non-transitory computer-readable medium of claim 9, wherein the instructions further cause the computer system to:
assign a first unique identifier to the first event record, the first unique identifier indicating a first type of business event;
augment the first event record to include metadata indicating the first unique identifier;
assign a second unique identifier to the second event record, the second unique identifier indicating a second type of business event; and
augment the second event record to include metadata indicating the second unique identifier.

11. The tangible non-transitory computer-readable medium of claim 10, wherein the business event comprises one of: a transaction, an agreement, a change in customer information, a customer life event, or a price calculation.

12. The tangible non-transitory computer-readable medium of claim 9, wherein the first event record and the second event record each comprise an extensible markup language (XML) file.

13. The tangible non-transitory computer-readable medium of claim 9, wherein:
the business process is provided by the first source application and the second source application, and
the business process is made available by a business server.

14. The tangible non-transitory computer-readable medium of claim 9, wherein a respective format associated with the first event information or the second event information is based upon a type of communication channel used for the respective interaction, and the communication channel is one of: telephone, mail, email, text, web interface, mobile app, or online chat.

15. The tangible non-transitory computer-readable medium of claim 9, wherein the instructions further cause the computer system to:
provide the first event record and the second event record as inputs to a machine learning algorithm, the machine learning algorithm determining a pattern based at least in part on the first event record and the second event record; and
output, in a report associated with the business process, the determined pattern.

16. A computer system configured to obtain information related to a business process, the computer system comprising one or more processors, servers, and/or transceivers configured to:
capture, in a first file having a first format, first event information indicative of a first interaction with a first step of the business process via a first source application;
extract, from the first file, first values from a data field having a first data field type, the first values characterizing the first interaction;
capture, in a second file having a second format different from the first format, second event information indicative of a second interaction with the business process via a second source application;
extract, from the second file, second values from a data field having the first data field type, the second values characterizing the second interaction;
generate a first event record, including:
the first values formatted according to a common data structure,
an indicator of the first data field type in association with the first values, and metadata indicating the first source application, wherein the metadata further comprises:
an indication of a type of communication channel used for the first interaction, and an indication of how the first interaction was inferred based upon one of: a change in data occurring during the first interaction, detection of a known event, or a result of testing the business process;
generate a second event record including:
the second values formatted according to the common data structure,
an indicator of the first data field type in association with the second values, and metadata indicating the second source application; and
store the first event record and the second event record in a database.

17. The computer system of claim 16, wherein the first event record and the second event record each comprise an extensible markup language (XML) file.

18. The computer system of claim 16, wherein the computer system is further configured to:
provide the first event record and the second event record as inputs to a machine learning algorithm, the machine learning algorithm determining a pattern based at least in part on the first event record and the second event record; and
output, in a report associated with the business process, the determined pattern.

* * * * *